United States Patent
Sofranko et al.

(10) Patent No.: US 10,810,523 B2
(45) Date of Patent: Oct. 20, 2020

(54) METHOD OF PROVIDING FABRICATION ENVIRONMENT

(71) Applicant: KONINKLIJKE PHILIPS N.V., Eindhoven (NL)

(72) Inventors: Richard Andrew Sofranko, Finleyville, PA (US); Anthony Vincent Startare, Belle Vernon, PA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/469,179

(22) PCT Filed: Dec. 20, 2017

(86) PCT No.: PCT/EP2017/083677
§ 371 (c)(1),
(2) Date: Jun. 13, 2019

(87) PCT Pub. No.: WO2018/115037
PCT Pub. Date: Jun. 28, 2018

(65) Prior Publication Data
US 2019/0332981 A1    Oct. 31, 2019

Related U.S. Application Data

(60) Provisional application No. 62/436,540, filed on Dec. 20, 2016.

(51) Int. Cl.
*G06Q 10/06* (2012.01)
*G06Q 10/08* (2012.01)
*G06F 9/50* (2006.01)

(52) U.S. Cl.
CPC ......... *G06Q 10/063* (2013.01); *G06F 9/5027* (2013.01); *G06Q 10/08* (2013.01)

(58) Field of Classification Search
CPC .. G06Q 10/063; G06Q 10/08; G06Q 30/0621; G06Q 10/103; G06F 9/5027
See application file for complete search history.

(56) References Cited

U.S. PATENT DOCUMENTS 8,793,194 B2    7/2014  Hohyung
9,588,726 B2 *  3/2017  Webb ................. H04N 1/32529
(Continued)

OTHER PUBLICATIONS

International Search Report—PCT/EP2017/083677 filed Dec. 20, 2017.
(Continued)

*Primary Examiner* — Charles R Kasenge
(74) *Attorney, Agent, or Firm* — Michael W. Haas (57) ABSTRACT

A method of manufacturing a customized product overcomes the shortcomings of conventional manufacturing methodologies. This is achieved according to one embodiment of the present invention by providing a method of manufacturing a customized product that employs a fabrication environment that includes a plurality of patients in need of a customized product, and a plurality of manufacturers who employ additive manufacturing equipment that is capable of manufacturing customized products, and a computer that identifies correspondence between patients and manufacturers in order to enable a specification of a customized product that is customized for a particular patient to be forwarded to an appropriate manufacturer along with an instruction to manufacture the customized product.

6 Claims, 3 Drawing Sheets

(56) References Cited

U.S. PATENT DOCUMENTS

| | | | |
|---|---|---|---|
| 9,946,816 B2* | 4/2018 | Kim | G06F 17/5009 |
| 2006/0235706 A1 | 10/2006 | Rodrigue et al. | |
| 2009/0271468 A1 | 10/2009 | Distefano | |
| 2014/0279353 A1 | 9/2014 | Findlan et al. | |
| 2014/0288699 A1* | 9/2014 | Williams | G07F 17/26 |
| | | | 700/233 |
| 2015/0205544 A1* | 7/2015 | Webb | H04N 1/32539 |
| | | | 358/1.15 |
| 2015/0220748 A1* | 8/2015 | Leach | G06F 21/10 |
| | | | 726/26 |
| 2015/0269282 A1* | 9/2015 | Nelaturi | G06F 17/50 |
| | | | 700/98 |
| 2015/0269289 A1* | 9/2015 | Kim | G06F 17/5009 |
| | | | 703/6 |
| 2015/0269290 A1* | 9/2015 | Nelaturi | G06F 17/5009 |
| | | | 703/6 |
| 2016/0059489 A1* | 3/2016 | Wang | H04L 67/16 |
| | | | 700/119 |
| 2016/0171354 A1* | 6/2016 | Glasgow | G06Q 30/00 |
| | | | 358/1.14 |
| 2016/0210312 A1* | 7/2016 | Webb | G06Q 30/0635 |
| 2017/0150004 A1* | 5/2017 | Webb | H04N 1/32539 |

OTHER PUBLICATIONS

"To live the life you want, take an active role in your sleep therapy." http://www.sleepapnea.com/products/dreammapper.

* cited by examiner

Name of business: ____________ ⌒24
Business location: ____________ ⌒24

Model     Quantity Additive manufacturing equipment used   ______ ⌒24   ______ ⌒24
                                              ______ ⌒24   ______ ⌒24

Day     Start    Stop Hours of operation:  ______ ⌒24  ______ ⌒24  ______ ⌒24
                          ______ ⌒24  ______ ⌒24  ______ ⌒24

[Upload] — 28

Patient name: ____________ ⌒36
Location: ____________ ⌒36
Patient number: ____________ ⌒36
Model identifier: ____________ ⌒36
Material: ____________ ⌒36
Urgency level:

36⌒ ○ High     36⌒ ○ Moderate     36⌒ ○ Low

Payment: ____________   [Upload] — 40

METHOD OF PROVIDING FABRICATION ENVIRONMENT

CROSS-REFERENCE TO PRIOR APPLICATIONS

This application claims the priority benefit under 35 U.S.C. § 371 of International Patent Application No. PCT/EP2017/083677, filed on Dec. 20, 2017, which claims the priority benefit of U.S. Provisional Patent Application No. 62/436,540, filed on Dec. 20, 2016, the contents of which are herein incorporated by reference.

BACKGROUND OF THE INVENTION

1. Field of the Invention

The present invention pertains to additive manufacturing technologies and, in particular, to a method of providing a fabrication environment that matches patients who need a customized product with manufacturers having additive manufacturing capabilities to make customized products.

2. Description of the Related Art

Numerous types of customized products are known in the relevant art. Among the many types of customized products are products that are used by patients for various types of therapeutic reasons. For instance, and by way of example, certain patients require Continuous Positive Air Pressure (CPAP) therapy that typically includes some type of a patient interface and a headgear. The patient interface and headgear would desirably fit the patient in a snug, comfortable, and reliable fashion, and such a fit is often difficult to achieve due to the great variability of shapes and sizes of patient heads and faces.

It thus has also been known to provide a limited number of such devices of different sizes and shapes that are together intended to provide an acceptable degree of fit with a large segment of the relevant population. Nevertheless, the overall fit is often at most only marginally acceptable with a large number of people, and this is despite the ability to vary the lengths of straps and for the ability of cushions to fit broad ranges of facial styles.

It thus has also been known to sometimes provide customized products that are tailor made to a particular individual. The cost of making a product that is customized to an individual patient typically is far in excess of the cost to provide a conventional mass-produced product since such mass-produced products typically will benefit from mass-production methodologies. While additive manufacturing techniques have been employed to manufacture customized products, the equipment is extremely expensive, and entrepreneurs may be hesitant to invest the money necessary to purchase the required additive manufacturing equipment due to the rapid changes in technology that regularly occur. For instance, a given additive manufacturing machine might be state-of-the-art one day, but it might be rendered obsolete by another more robust but similar technology the next day. This problem is exacerbated when someone is contemplating the manufacturing of a large number of customized products inasmuch as a risky investment in a single machine that might easily become obsolete is magnified in a situation where the person would need to buy a large number of machines to in order to meet the demands of manufacturing customized products in a certain market segment. Improvements thus would be desirable.

SUMMARY OF THE INVENTION

Accordingly, it is an object of the present invention to provide a method of manufacturing a customized product that overcomes the shortcomings of conventional manufacturing methodologies. This object is achieved according to one embodiment of the present invention by providing a method of manufacturing a customized product that employs a fabrication environment that includes a plurality of patients in need of a customized product, a plurality of manufacturers who employ additive manufacturing equipment that is capable of manufacturing customized products, and a computer that identifies correspondence between patients and manufacturers in order to enable a specification of a customized product that is customized for a particular patient to be forwarded to an appropriate manufacturer along with an instruction to manufacture the customized product.

It is yet another object of the present invention to provide a method of manufacturing a customized product that does not suffer from the disadvantages associated with conventional manufacturing techniques. This object is achieved by providing a method that includes deploying an interface on a computer network, receiving on the interface a request for the manufacture of a customized product having one or more properties that are customized for a particular individual, maintaining in a storage a listing that includes a plurality of manufacturers that employ additive manufacturing equipment to perform additive manufacturing operations and that are capable of manufacturing one or more items via the additive manufacturing operations according to a received specification for each of the one or more items, identifying one or more potential manufacturers from among the plurality of manufacturers that are suitable for manufacturing the customized product, and sending to a particular manufacturer from among the one or more potential manufacturers a specification for the customized product and an instruction to manufacture the customized product via an additive manufacturing operation.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Figure 1:
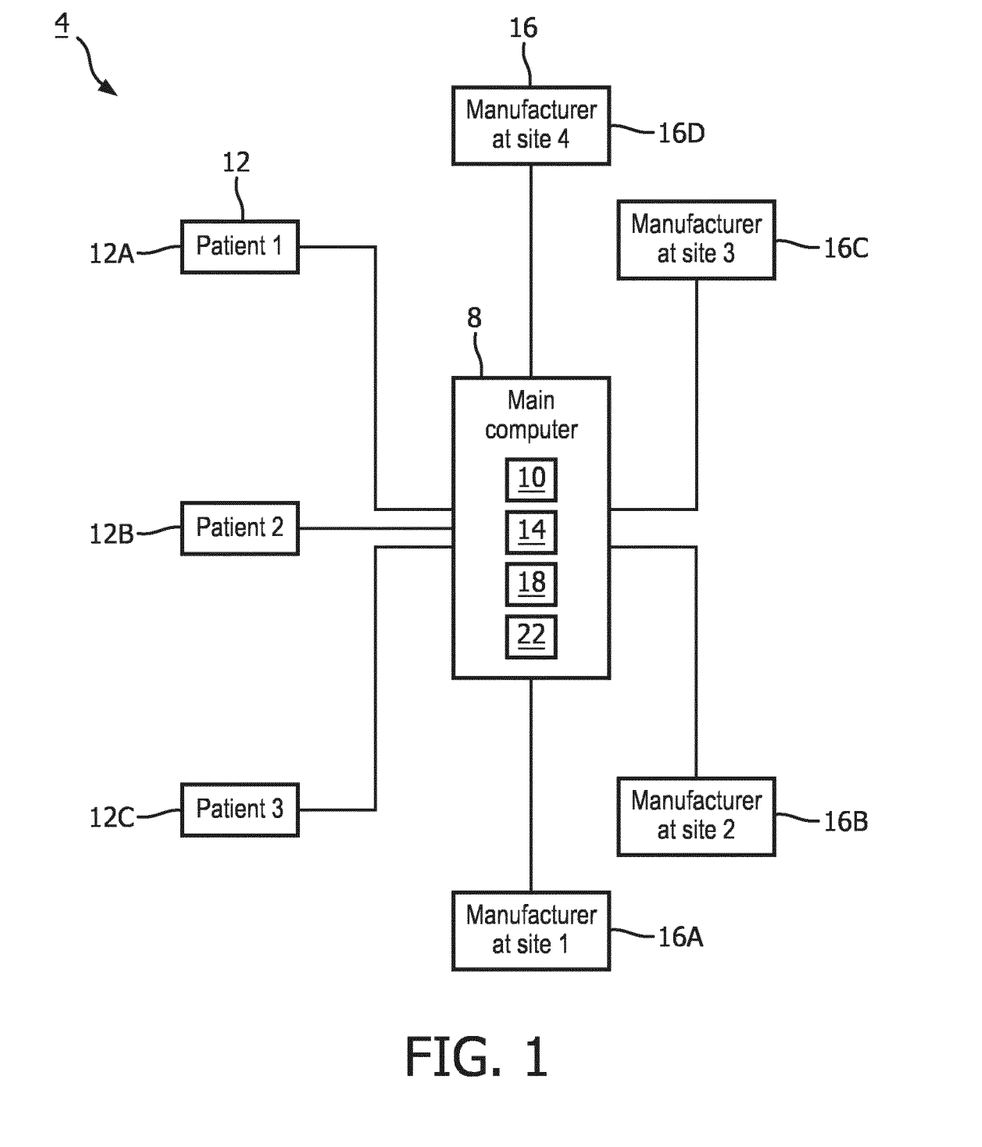
FIG. 1 is a schematic depiction of a fabrication environment that is usable in accordance with the disclosed and claimed concept to manufacture a customized product.

FIG. 1 schematically illustrates an exemplary embodiment of a fabrication environment 4 according to the principles of the present invention. Fabrication environment 4 can be said to include a main computer 8 that includes a storage 10 having one or more routines 22 that are stored therein and that are executable on one or more processors of main computer 8. Main computer 8 is representative of what likely will be a plurality of computers and communication devices of any of a variety of types that are interconnected with one another via a data communications network.

Fabrication environment 4 can further be said to include a plurality of patients that may be collectively or individually referred to herein with the numeral 12, and three of which are indicated in FIG. 1 at the numerals 12A, 12B, and 12C. Patients 12 may be physically located nearby one another or may be spaced worldwide and can include any number of patients 12 who are in need of a custom manufactured product of any type. Fabrication environment system 4 can further be said to include a plurality of manufacturers that may be collectively or individually referred to herein with the numeral 16, and four of which are indicated in FIG. 1 at the numerals 16A, 16B, 16C, and 16D. Manufacturers 20 are physically situated at any of a variety of locations within a given region and may be distributed worldwide without departing from the spirit of the present disclosure. As will be set forth in greater detail below, fabrication environment 4 advantageously enables patients 12 who are each in need of a custom manufactured product to be connected with an appropriate manufacturer 16 from among the plurality of manufacturers 16 which are capable of manufacturing the customized product for patient 12. Manufacturer 16 may be selected according to an optimization that may be based upon correspondence between one or more parameters of patient 12 with one or more characteristics of manufacturer 16.

Figure 2:
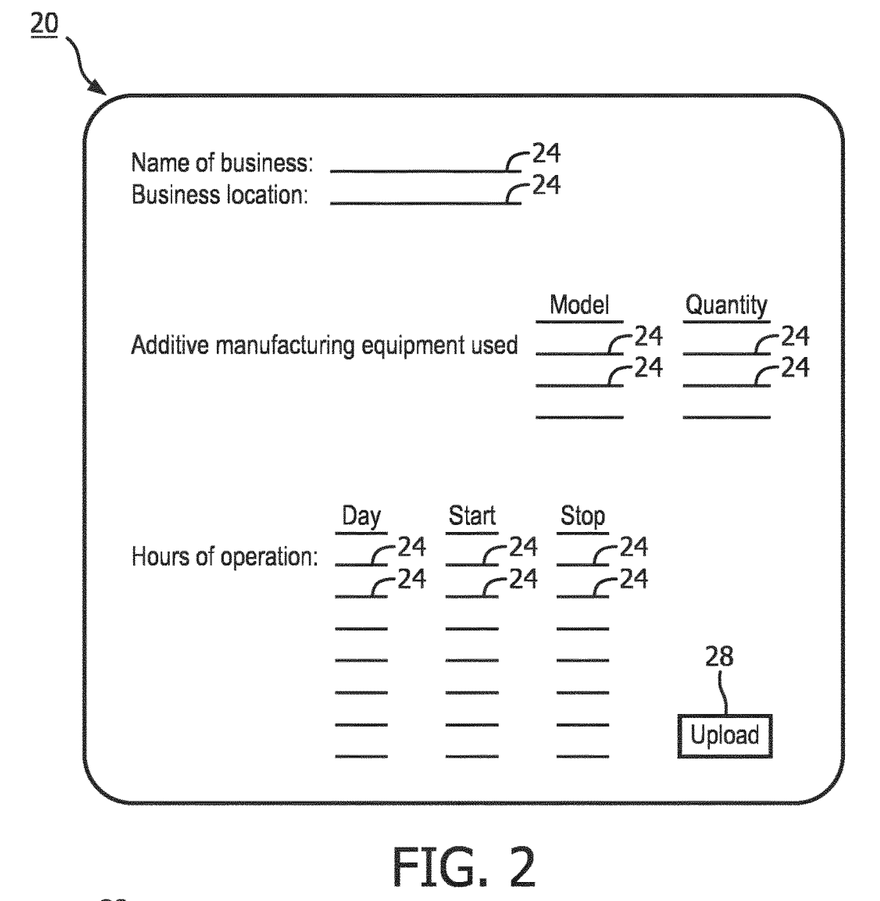
FIG. 2 is an exemplary depiction of a dialog screen that is output by a manufacturing interface and that enables a prospective manufacturer of customized products to join the fabrication environment of FIG. 1.

In order to do so, main computer 8 stores in storage 10 a listing 14 that includes information regarding manufacturers 16 and which enables manufacturers 16 to be matched with patient 12. FIG. 2 depicts an exemplary dialog screen of a manufacturing interface 20 that is deployed on main computer 8 and which can be visually displayed on a computer used by someone, i.e., a prospective manufacturer, who wishes to become a manufacturer 16 among manufacturers 16. The dialog screen of manufacturing interface 20 enables the prospective manufacturer to upload various characteristics of the prospective manufacturer for storage in listing 14.

For example, the dialog screen of manufacturing interface 20, such as is depicted in FIG. 2, includes a plurality of input fields 24 that are exemplary in nature. Input fields 24 enable the prospective manufacturer to input its relevant characteristics into input fields 24 and to thereby become one of manufacturers 16 and thus be known to main computer 8 and be a part of fabrication environment 4. For instance, one of input fields 24 is one for "business location", and others relate to the model and quantity of the additive manufacturing equipment that is used at the business location. Other input fields 24 enable the inputting of the daily business hours at the location. It is understood that numerous other input fields 24 can be provided in order to enable other characteristics of the prospective manufacturer to be uploaded. For instance, the prospective manufacturer could be asked via the input fields 24 if it is willing to assist with the shipping of the customized product to patient 12, whether it offers expedited manufacturing services, whether it has a minority hiring program, and any of a variety of input fields. The values that are entered into the input fields 24 are then uploaded as characteristics of that manufacturer 16 once the manufacturer actuates an UPLOAD button 28 of manufacturing interface 20. Once the contents of input fields 24 are uploaded to main computer 8, the characteristics that are the contents of input fields 24 are added to listing 14 and are associated with the prospective manufacturer (that is now one of manufacturers 16) that uploaded them.

The dialog screen that is depicted in FIG. 2 might be said to represent (via input fields 24) the minimum data that can be entered by someone that will still enable them to become one of the manufacturers 16, although this need not necessarily be the case. For instance, other characteristics than those depicted expressly in FIG. 2 can be employed in order to establish someone as one of the manufacturers 16 without departing from the spirit of the present disclosure. For reasons that will be set forth in greater detail below, however, the business location, the nature and quantity of the additive manufacturing equipment that is used at the business location, and the hours of operation typically will be of significant importance in matching the manufacturer 16 with one of patients 12.

Figure 3:
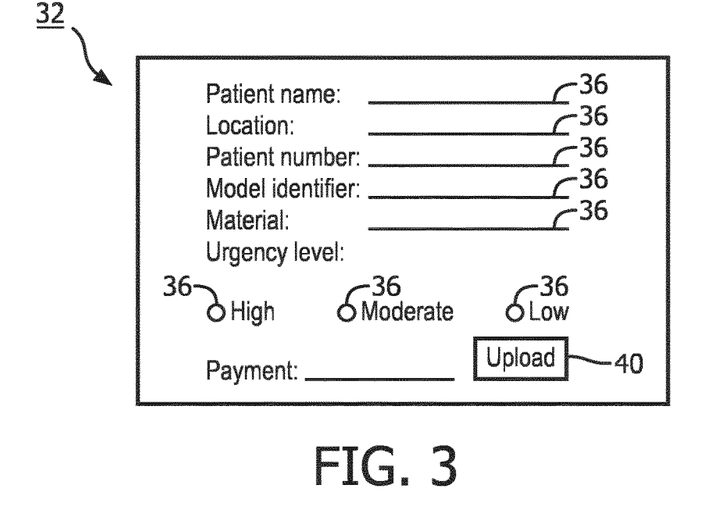
FIG. 3 is an exemplary depiction of a dialog screen that is output by a patient interface and that enables a patient to request the manufacturing of a customized product using the fabrication environment of FIG. 1.

FIG. 3 depicts a dialog screen that is generated by a patient interface 32 that is deployed on main computer 8 and which is visually output on a device that is operated by one of patients 12, such as a cellular telephone or other such electronic device, and that is capable of having patient interface 32 executed thereon. As can be seen in FIG. 3, the dialog screen of patient interface 32 includes a plurality of input fields 36 that enable patient 12 to input various information that becomes the parameters of the patient 12 who entered the various data into the various input fields 36. The exemplary input fields 36 include those for the name and location of patient 12, input fields 36 that enable an identification of the model of the customized product and the material from which the customized product is to be manufactured, and an urgency level. Additional input fields 36 enable the inputting of information regarding a payment, a patient number, and the like, and it is understood that any of a variety of different input fields or additional input fields or both can be employed in patient interface 32. The dialog screen output by patient interface 32 additionally includes an UPLOAD button 40 that submits the order to main computer 8, along with whatever information has been entered into the various input field 36.

Patient 12 typically has associated therewith a specification 18 which is stored in the main computer 8 or on the device used by patient 12 and which constitutes a design of the customized product that the patient desires to have manufactured. Specification 18 can be obtained or developed or derived in any of a variety of fashions, and it typically includes sufficient data to enable the selected manufacturer 16 to fully manufacture the customized product via additive manufacturing. In this regard, specification 18 typically includes information with regard to physical dimensions, contours, surface textures, materials from which the customized product is to be manufactured, porosity and density values, and the like which are relevant to characterizing the customized product that is desired to be manufactured. Specification 18, if stored in storage 10 on main computer 8, can be associated with the name of patient 12, or with the patient number of patient 12, or in any of a wide variety of fashions. As such, when patient 12 enters the parameters into input fields 36 and actuates the UPLOAD button 40, specification 18 is retrieved from storage 10 and is eventually communicated to an appropriate one of manufacturers 16 along with an instruction to manufacture the customized product that is specified in specification 18. It is noted that the privacy of patient 12 (name, address, name and usage of customized product, etc.) would be secure. The ordering of the customized product in the fashion described herein may additional involve the generation of a secure ID that exists only for the particular individual transaction and then is deleted.

More specifically, and as suggested above, the routines 22 compare the characteristics which are saved in listing 14 in association with the various manufacturers 16 with the parameters of patient 12 in order to identify whatever correspondence may exist therebetween. For example, one of the simplest types of correspondence would be physical proximity between patient 12 and manufacturer 16 since close physical proximity reduces shipping expense and shipping time. If, by way of example, proximity between patient 12 and the various manufacturers 16 was the only criterion being employed, whichever of manufacturers 16 is physically closest to patient 12 would be identified as having the greatest degree of correspondence with patient 12. In this example, the various manufacturers 16 might be output in a ranked order corresponding with relatively closest physical proximity to patient 12. It is noted, however, that the depicted exemplary embodiment includes additional comparisons between the characteristics of manufacturers 16 and the parameters of patient 12 in order to identify correspondence therebetween and output an optimized, i.e., ranked, listing of potential manufacturers 16.

By way of example, a particular material that is to be used in manufacturing the customized product may have been individually selected by patient 12, such as by an input into one of input fields 24, or the material may be included as a part of specification 18. By way of example, the materials that can be used by any given manufacturer 16 for the manufacture of customized products may be determined according to the model of additive manufacturing equipment that the manufacturer 16 has input into the input fields 36.

If the manufacturer 16 having the closest physical proximity to patient 12 is unable to manufacturer any customized products using that particular selected material, there would be no reason to list such manufacturer at the top of the ranked list of potential manufacturers 16. In fact, there would be no reason at all to list such a manufacturer 16 anywhere in the list as being a potential manufacturer of the customized product.

Further regarding materials, it is understood that the customized product can be manufactured out of any one or more of a variety of appropriate materials. For instance, metallic materials and polymeric materials are but two examples of materials that can be used via additive manufacturing equipment and operations to form the customized product or components thereof. Furthermore, it is expressly noted that biological material can be used via additive manufacturing equipment and operations to form the customized product or components thereof. For example, a plastic surgeon may wish to employ a 3D CAD software package to create a new left ear for a patient, wherein the new left ear is to be printed in collagen with the use of an advanced 3D printer. The applications for such technology are very broad and are possibly boundless. Hospitals could conceivably band together to augment the capabilities within their own manufacturing environment, which may be a subset of or may be separate from manufacturing environment 4. In this regard, hospitals may wish to employ their own systems or specially-designated systems inasmuch as manufacturing in a clean & sterile environment would likely be necessary.

It thus can be seen that certain logic will be employed by the routines 22 in order to identify potential manufacturers 16 from among all of the manufacturers 16 and to output them in a ranked order of suggested preference. For example, a manufacturer 16 having closer physical proximity to patient 12 will get a relatively higher score in the proximity category than another manufacturer 16 who is at a greater distance from patient 12. On the other hand, in a situation where a manufacturer 16 is unable to use the particular material that has been selected or otherwise specified, the manufacturer 16 will not only get zero score for that category (i.e., material), the logic will necessitate that such manufacturer 16 be removed from contention inasmuch as the manufacturer 16 has no way of fulfilling the order for the customized product. That is, such a manufacturer won't be output at a relatively low position in the ranked listing of potential manufacturers 16. Rather, such a manufacturer will not even be a part of the ranked listing. It thus can be understood that any of a wide variety of logical steps can be taken in determining which of the manufacturers 16 is an appropriate potential manufacturer of the customized product and in determining which manufacturer 16 has the greatest correspondence with patient 12. This will be largely based upon the categories of characteristics and the categories of parameters that are compared with one another for correspondence by the routines 22 that are executed on main computer 8.

By way of further example, input fields 36 enable patient 12 to enter as another exemplary parameter an urgency level that can be one of HIGH, MODERATE, and LOW. Other variations will be apparent. The routines 22 can then compare the various characteristics of the various manufacturers 16 in order to assess the ability of the various manufacturers 16 to rapidly manufacture the customized product specified by specification 18. For instance, the routines 22 might evaluate the quantity and model numbers of the additive manufacturing equipment employed by the various manufacturers 16 in order to gauge production capability. Additionally, the routines 22 might evaluate whether or not any of the manufacturers 16 has a backlog of products that must be manufactured before the requested customized product specified in specification 18 can be manufactured. Furthermore, the routines 22 may consider the hours and the days that each manufacturer 16 is in operation in order to gauge a manufacturing capability. Likewise, the routines 22 might consider such day and hour characteristics of the manufacturer in order to determine whether, for example, the manufacturer might be closed for the next two days over a weekend if the order is being placed by patient 12 on a Friday afternoon. Moreover, physical proximity between the patient and the various manufacturers 16 might be given greater weight if the urgency with which the customized product is needed is relatively great. It thus can be seen that many factors may be weighed in a variety of fashions in order to optimize the selection of potential manufacturers 16 who are best suited to manufacture the customized product.

As an example, a manufacturer may receive a score of either one (1) or zero (0) in each of a variety of categories. If the manufacturer 16 is, for example, within one thousand (1000) miles of patient 12, the manufacturer 16 may receive one point for the proximity category. If the manufacturer 16 has no backlog and the urgency level of patient 12 is HIGH, the manufacturer 16 will receive one additional point. If the manufacturer 16 is open for manufacturing on the following calendar day and the urgency level of patient 12 is HIGH, the manufacturer 16 will receive one additional point. In such a situation, such a manufacturer will receive 1+1+1=3 points. This manufacturer 16 would be output at a higher priority position in the output than another manufacturer 16 who was not within one thousand (1000) miles of patient 12 but met the other two aforementioned criteria and thus received a score of 0+1+1=2 points. This is intended merely as an example of the many ways in which the scores of manufacturers 16 may be calculated.

Further in this regard, it is noted that certain manufacturers 16 may have other limitations on their ability to manufacture the customized product. For instance, one or more of manufacturers 16 might have a maximum size of product that can be manufactured by the additive manufacturing equipment specified in the various input fields 24. As such, specification 18 may be, in whole or in part, communicated to main computer 8 with the parameters that were entered into the input fields 36 if specification 18 was not already stored in storage 10. That is, in some scenarios specification 18 may have been generated in a medical care facility and uploaded to main computer 8 immediately upon its generation in order to enable patient 12 to find an appropriate manufacturer 16 to manufacture the customized product. Alternatively, it is possible that patient 12 may generate specification 18 herself in any of a variety of fashions and may upload it along with the parameters that have been input into the input fields 36 when the UPLOAD button 40 is actuated. As such, the routines 22 might consult specification 18 in order to determine whether any one or more of the manufacturers 16 would be unable to manufacture the particular customized product based upon size limitations.

In this regard, another example of the logic that might be employed is whether a given manufacturer might have only a single machine out of many that is capable of manufacturing the customized product. Furthermore, the routines 22 might determine that such a manufacturer 16 has an extremely small backlog for the number of additive manufacturing machines that are employed on site, but the routines 22 might determine from the specific projects that are the subject of the backlog that the particular additive manufacturing machine that would be needed in order to manufacture the customized product according to specification 18 is the sole subject of the backlog. In such a case, such a manufacturer 16 might receive a relatively low score despite having an otherwise significant manufacturing capability based upon the manufacturer's inability to rapidly manufacture the particular customized product according to specification 18. Other variations would be apparent.

As suggested above, the logic employed by the routines 22 will assign to each of the various manufacturers 16 an overall score for correspondence between the characteristics of the manufacturer 16 and the parameters of patient 12. The various manufacturers 16 will then be output in a ranked order with the manufacturer 16 having the greatest degree of correspondence between its characteristics and the parameters of patient 12 being listed first.

It thus can be seen that by employing fabrication environment 4, various manufacturers 16 who employ additive manufacturing equipment and which have the capability of thereby manufacturing various customized products can be placed into contact with patients 12 who have a need for a customized product to be manufactured. That is, significant difficulty has been encountered in attempting to implement any type of large scale manufacturing of customized products because the additive manufacturing equipment that would be required is not only costly but is also potentially subject to becoming obsolete at any given time. However, by combining the various manufacturers 16 into fabrication environment 4, any given manufacturer 16 need not be especially concerned that the equipment that is being used will become unusable as a result of obsolescence inasmuch as the overall quantity of customized products that are in need of manufacture will on some level keep such ostensibly obsolete additive manufacturing equipment in use. Moreover, a manufacturer or service provider in a certain market segment can be expected to receive a certain amount of business in the manufacturing of customized products since the manufacturing demand in the market segment likely will be of sufficient magnitude to keep manufacturers 16 busy. Additionally, any given manufacturer 16 who sees a need and/or a business opportunity can, for example, purchase an additional piece of additive manufacturing equipment and can place that piece of equipment into service knowing that the large number of patients 12 will likely keep the piece of equipment busy.

As such, fabrication environment 4 enables and provides a large scale and scalable custom manufacturing capability where none had previously made business sense since the manufacturing capability is distributed potentially worldwide and is backed by correspondingly worldwide investment dollars. The result is that patients 12 who need a custom manufactured product are able to obtain such a customized product at a reasonable cost due to the large number of manufacturers 16 that are a part of manufacturing environment 4 and which potentially can compete with one another in order to win manufacturing contracts with patients 12. Furthermore, it is emphasized that fabrication environment 4 presents patients 12 and other end customers the ability to always be able to obtain parts from the highest quality printers having the latest materials. Other advantages will be apparent.

It is noted that the match-up between patient 12 and manufacturer 16 can be completely transparent to patient 12. For example, patient 12 may be completely unaware of the calculations and operations that are being performed on main computer 8 and elsewhere to match the request from patient 12 with the best-matched manufacturer 16. By way of further example, the act of confirming the purchase by patient 12 may, for example, trigger the match-up and fabrication. Alternatively, some patients 12 (or business workflows) might want transparency to the options for a variety of reasons. In such a scenario, the software interface might be meaningfully different than patient interface 12, but the underlying functionality described herein likely would be the same. Furthermore, it is noted that the software that performs or facilitates the match-up can be run on a website or a smartphone or elsewhere, by way of example. In addition, the matchup could be calculated on a phone's app or on main computer 8 or a component thereof that may be operated by an entity who is in the business of developing and providing such medical products, including the customized product and non-customized products, or a subsidiary thereof.

Figure 4:
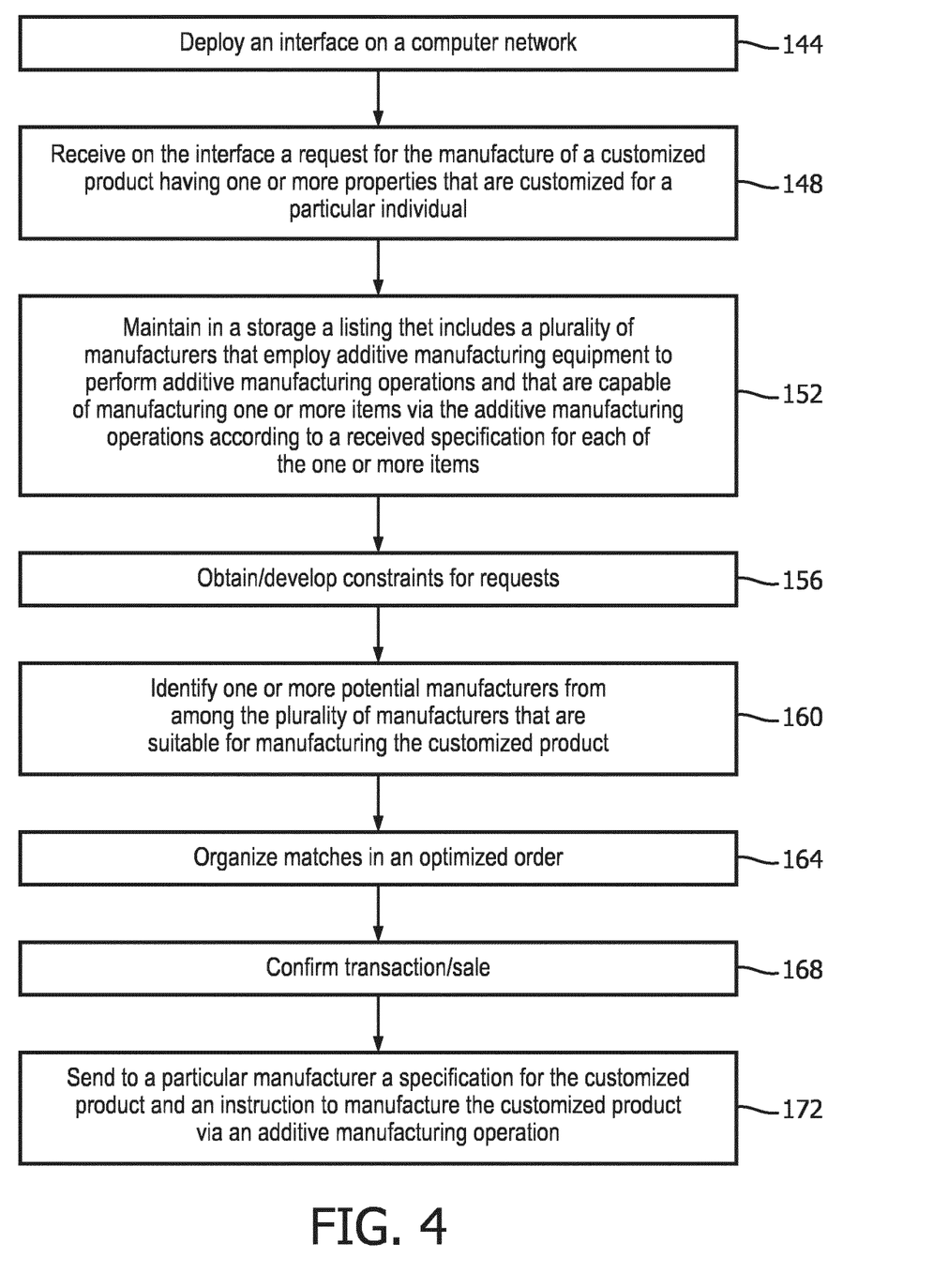
FIG. 4 is a flowchart depicting certain aspects of the disclosed and claimed concept.

Certain aspects of an improved method in accordance with the disclosed and claimed concept are depicted in a flowchart shown in FIG. 4. Processing begins, as at 144, where manufacturing interface 20 and patient interface 32 are deployed on main computer 8. Main computer 8 receives, as at 148, a request via patient interface 32 for the manufacture of a customized product having one or more properties that are customized for a particular individual such as patient 12. Main computer 8 will already have developed and will maintain, as at 152, in storage 10 the listing 14 that includes the plurality of manufacturers 16 that employ additive manufacturing equipment to perform additive manufacturing operations. Such manufacturers 16 are capable of manufacturing one or more items via such additive manufacturing operations according to the specifications 18 that has been received for each of the one or more items that are desired to be manufactured.

In this regard, all of the manufacturers 16 likely will have implemented as part of the manufacturing interface 20 certain hardware interfaces on its additive manufacturing equipment that enable a standardized specification 18 to be received from main computer 8 and to be used to manufacture the customized product without being concerned about exactly what brand or style of additive manufacturing device is being employed. That is, the additional hardware interfaces would be specific to the particular additive manufacturing equipment and would enable the specification 18 to be standardized instead of tailoring specification 18 for a particular type of additive manufacturing equipment. This would avoid the need, say, for specification 18 to be arranged in a particular way in order for the customized product to be manufactured by one type of additive manufacturing machine and to be arranged in a different way in order for the customized product to be manufactured by another type of additive manufacturing machine. Such standardization enables specification 18 to be communicated to any of a variety of manufacturers 16, and the resultant customized product will be virtually identical between any of the various manufacturers 16.

Further in this regard, the customized product that is specified by specification 18 may have added thereto or have provided therewith a scale or gauge, such as a mark that is of a certain length or dimension which, once manufactured, can be measured by patient 12 using a ruler, for instance, in order to ensure that the resultant customized product was actually manufactured in accordance with specification 18. If the exemplary mark on the customized product is supposed to be one inch in length and is measured by patient 12 and is determined to be exactly one inch in length, the customized product is determined to have been correctly manufactured. On the other hand, if the mark that is supposed to be one inch in length is only 0.9 inches in length, this will indicate a need for patient 12 to contact the manufacturer 16 who made the customized product and request a replacement. Alternatively, a separate gauge block or other separate structure may be provided along with the customized product. If a separate gauge block is printed (i.e., manufactured) along with the actual customized product or component thereof, the gauge block could be sent to patient 12 along with the actual customized product for end-user verification by patient 12 of the accuracy of the print job. Such markings and gauges enable rapid confirmation of whether a customized product manufactured via additive manufacturing methodologies or other methodologies has been manufactured according to the specification 18.

Processing then continues, as at 156, where main computer 8 obtains and develops the various constraints for such purchase requests. The constraints would be, for example, the parameters that were input into the input fields 36 of patient interface 32 when patient 12 uploaded a request for the manufacture of a customized product. Processing then continues, as at 160, where the main computer 8 is employed to identify one or more potential manufacturers from among the manufacturers 16 that are suitable for manufacturing the customized product. The potential manufacturers 16 that have been matched at 160 are then organized in an optimized order based upon any of a variety of logical relationships according to the routines 22. The transaction and sale is then confirmed, as at 168.

Processing then continues, as at 172, where a particular manufacturer 16 from among the plurality of manufacturers 16 has sent thereto the specification 18 for the customized product and an instruction to manufacture the customized product via an additive manufacturing operation. Upon manufacture of the customized product, the customized product will be shipped to patient 12 for therapeutic use thereby.

As can be seen from the foregoing, therefore, fabrication environment 4 enables the customized manufacturing of a large number of products that previously was unable to be provided for a variety of reasons. When fabrication environment 4 is employed to provide therapeutic devices to patients 12, the advantages are especially helpful because they enable an improved degree of therapeutic care. Other advantages will be apparent.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of manufacturing a customized product, comprising:
   deploying an interface on a computer network;
   receiving on the interface a request for the manufacture of a customized product having one or more properties that are customized for a particular individual;
   maintaining in a storage a listing that includes a plurality of manufacturers that employ additive manufacturing equipment to perform additive manufacturing operations and that are capable of manufacturing one or more items via the additive manufacturing operations according to a received specification for each of the one or more items;
   identifying, via the interface, one or more potential manufacturers from among the plurality of manufacturers that are suitable for manufacturing the customized product;
   sending to a particular manufacturer from among the one or more potential manufacturers a specification for the customized product and an instruction to manufacture the customized product via an additive manufacturing operation;
   receiving as at least a part of the request one or more parameters of at least one of the customized product and the particular individual;
   maintaining as at least a part of the listing one or more characteristics of each of the plurality of manufacturers, and
   identifying the one or more potential manufacturers based at least in part upon a correspondence between at least a portion of the one or more parameters and at least a portion of the one or more characteristics of each of the one or more potential manufacturers;
   employing a correspondence between a plural quantity of the parameters and a plural quantity of the characteristics to identify the one or more potential manufacturers;
   ranking the one or more potential manufacturers based upon a degree of correspondence between the plural quantity of parameters and the plural quantity of characteristics;
   employing as at least a portion of the plural quantity of parameters a location of the particular individual and a level of urgency with which the customized product is required by the particular individual;
   employing as at least a portion of the plural quantity of characteristics a location of the manufacturer and a value representative of the time within which the customized product can be manufactured by the manufacturer; and
   employing as the value that is representative of the time within which the customized product can be manufactured at least one of:
   a backlog of pending manufacturing orders with the manufacturer, and
   the daily hours during which the manufacturer is in operation.

2. The method of claim 1, further comprising receiving from the manufacturer via the computer network and maintaining in the storage at least one of:
   an identity of the type of additive manufacturing equipment used by the manufacturer; and
   a list of the one or more materials.

3. The method of claim 1, further comprising:
   receiving from the manufacturer via the computer network and maintaining in the storage an identity of the type of additive manufacturing equipment used by the manufacturer;
   as at least a part of the one or more parameters at least a first physical dimension of the customized product; and
   selecting the one or more potential manufacturers from among the plurality of manufacturers based at least in part upon the capability of the type of additive manufacturing equipment being used by the one or more potential manufacturers to manufacture an item that is at least of the first physical dimension.

4. The method of claim 1, further comprising receiving from the manufacturer via the computer network at least a portion of the one or more characteristics.

5. The method of claim 4, further comprising employing the interface to output a dialog screen with which each of the plurality of manufacturers can interact and which enables each of the plurality of manufacturers to input into the interface at least a portion of the one or more characteristics.

6. The method of claim 1, further comprising employing the computer network to electronically communicate to the particular manufacturer the specification and the instruction.

* * * * *